United States Patent [19]

Tsuruta et al.

[11] 4,121,699
[45] Oct. 24, 1978

[54] DISK BRAKE ASSEMBLY FOR AUTOMOTIVE VEHICLES

[75] Inventors: Matsuhisa Tsuruta; Masatada Yokoi; Juichi Shibatani; Harumi Ohori; Yuichiro Obu, all of Toyota, Japan

[73] Assignees: Aisin Seiki Kabushiki Kaisha; Toyota Jidosha Kogyo Kabushiki Kaisha, both of Japan

[21] Appl. No.: 808,610

[22] Filed: Jun. 21, 1977

[30] Foreign Application Priority Data

Jun. 23, 1976 [JP] Japan ............................. 51-82236[U]

[51] Int. Cl.² ......................................... F16D 65/02
[52] U.S. Cl. ................................. 188/73.3; 188/73.1; 188/73.6; 188/250 B
[58] Field of Search ................... 188/72.4, 73.1, 73.3, 188/73.5, 73.6, 250 B, 250 F, 250 G

[56] References Cited

U.S. PATENT DOCUMENTS

| | | | |
|---|---|---|---|
| 3,346,076 | 10/1967 | Hayes | 188/73.3 |
| 3,395,780 | 8/1968 | Swift | 188/72.4 |
| 3,500,967 | 3/1970 | Nolan | 188/72.4 |
| 3,865,215 | 2/1975 | Burgdorf et al. | 188/73.6 |
| 3,930,564 | 1/1976 | Kobayashi et al. | 188/73.3 |
| 4,004,658 | 1/1977 | Margetts et al. | 188/72.4 |

FOREIGN PATENT DOCUMENTS

| | | | |
|---|---|---|---|
| 2,345,733 | 3/1975 | Fed. Rep. of Germany | 188/73.5 |
| 2,547,170 | 5/1976 | Fed. Rep. of Germany | 188/73.3 |

*Primary Examiner*—Edward R. Kazenske
*Attorney, Agent, or Firm*—Oblon, Fisher, Spivak, McClelland & Maier

[57] ABSTRACT

In a sliding type disk brake assembly having a caliper movable on a pair of shoulders of a support member, a fluid actuator on one side of the caliper to press an inner brake shoe against one face of a rotary disk, and a reaction portion on the opposite side of the caliper to press an outer brake shoe against the other face of the disk, the reaction portion being provided substantially at its central portion with a pair of rectangular shaped recesses and the backing plate of the outer brake shoe having a pair of abutment flanges engaged within the recesses, the length dimension of the backing plate being smaller than the spacing between the two shoulders of the support member.

4 Claims, 13 Drawing Figures

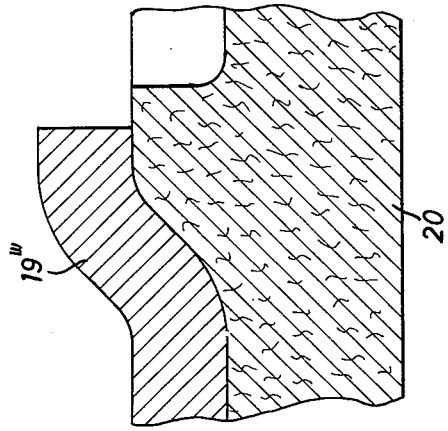
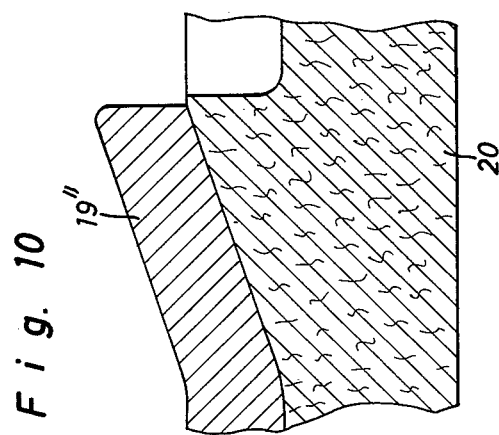

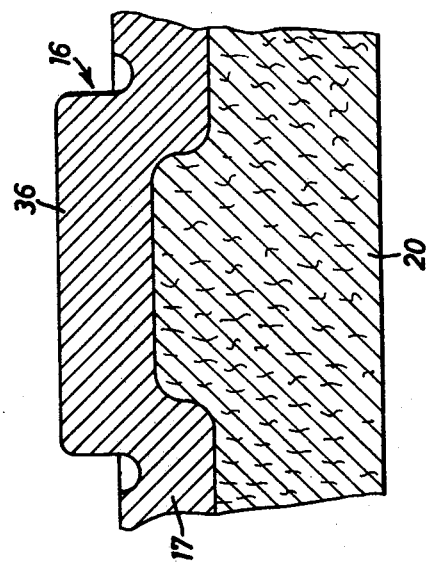
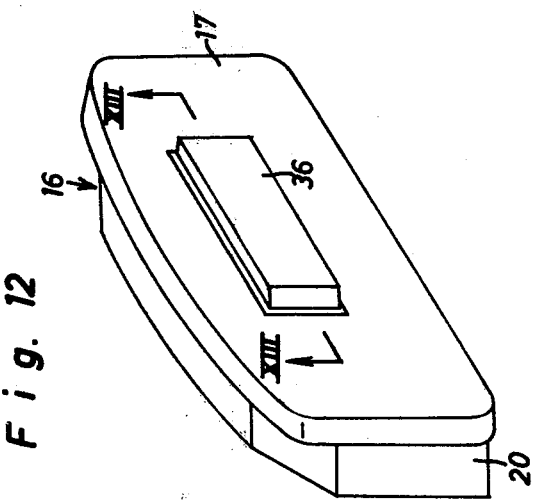

DISK BRAKE ASSEMBLY FOR AUTOMOTIVE VEHICLES

BACKGROUND OF THE INVENTION

The present invention relates to disk brake assemblies for automotive vehicles, and more particularly to an improvement in a sliding or floating caliper type disk brake assembly.

DESCRIPTION OF THE PRIOR ART

In conventional sliding or floating caliper type disk brake assemblies, as shown in FIGS. 1 and 2 of the accompanying drawings, a caliper member 2 has a cylinder body 2A and a reaction portion 2B straddling a portion of a rotary disk (not shown) secured for rotation with a vehicle wheel. The caliper member 2 is slidably supported on a pair of shoulders 1a and 1b of a stationary support member 1 in the form of a torque plate and is movable in an axial direction. Within a cylindrical bore formed in the cylinder body 2A, a piston (not shown) is axially slidably disposed to press an inner brake shoe directly against one face of the rotary disk. An outer brake shoe 6 is carried by the reaction portion 2B of the caliper member 2 to engage the other face of the rotary disk due to reaction force caused by actuation of the piston. The reaction portion of the caliper member 2 is formed with a large central recess 3 to allow the insertion of the piston into the cylindrical bore of the cylinder body 2A. The recess 3 bifurcates the reaction portion 2B into a pair of support legs 4 and 5 which are provided at their outsides with a pair of rectangular shaped recesses 11 and 12 to support the outer brake shoe 6 thereon. The outer brake shoe 6 includes a backing plate 7 made from a planar sheet metal and having a brake lining fixed thereto. The backing plate 7 is sheared and indented at its opposite portions to form struck-up abutments 8 and 9.

Thus, as shown in FIG. 1, the outer brake shoe 6 is supported in place by engagement of the abutments 8 and 9 of the backing plate 7 with the recesses 11 and 12 of the reaction portion 2B, in which the rotation torque exerted on the outer brake shoe 6 is transmitted to the caliper member 2 through the abutments 8 and 9 and reacted against the torque plate 1. In the disk brake assembly shown in FIG. 2, the rotation torque exerted on the outer brake shoe 6 is directly reacted against the torque plate 1 by engagement of the upper shoulders 7a and 7b of the backing plate 7 against the pair of shoulders 1a and 1b of the torque plate 1.

In the construction of the conventional disk brake assembly, the size of the backing plate 7 becomes inevitably larger in width because the backing plate 7 is held at the outsides of the reaction portion 2B of the caliper member 2. As a result, the whole construction of the disk brake assembly becomes large in size and heavy in weight. Furthermore, if the lining of the outer brake shoe 6 is defaced, the backing plate 7 is displaced toward the inner brake shoe and finally positioned under the shoulders 1a and 1b of the torque plate 1. This results in difficulty of disassembling works of the outer brake shoe 6 due to the interference of the shoulders 1a and 1b of the torque plate 1 against the backing plate 7 when moved upwardly.

SUMMARY OF THE INVENTION

The primary object of the present invention is, therefore, to provide an improved disk brake assembly, wherein the backing plate of the outer brake shoe can be made smaller in width to make the whole construction of the assembly as small as possible and to facilitate the disassembling works of the defaced outer brake shoe.

A further object of the present invention is to provide an improved disk brake assembly, having the above-mentioned characteristics, wherein the backing plate of the outer brake shoe is supported at the inner sides of the caliper reaction portion to reduce the rotation torque transmitted to the caliper member through the backing plate.

BRIEF DESCRIPTION OF THE DRAWINGS

Various other objects, features and attendant advantages of the present invention will be more fully appreciated as the same become better understood from the following detailed description when considered in connection with the accompanying drawings in which like reference characters designate like or corresponding parts throughout the several views, and wherein:

FIG. 8 is a perspective view of the outer brake shoe shown in FIG. 3;

FIGS. 10 and 11 illustrate partially enlarged cross-sections of modified outer brake shoes of the present invention;

FIG. 12 is a perspective view of another modification of the outer brake shoe shown in FIG. 8; and FIG. 13 is an enlarged sectional view taken along the line XIII - XIII of FIG. 12.

DESCRIPTION OF THE PREFERRED EMBODIMENTS

Figure 1:
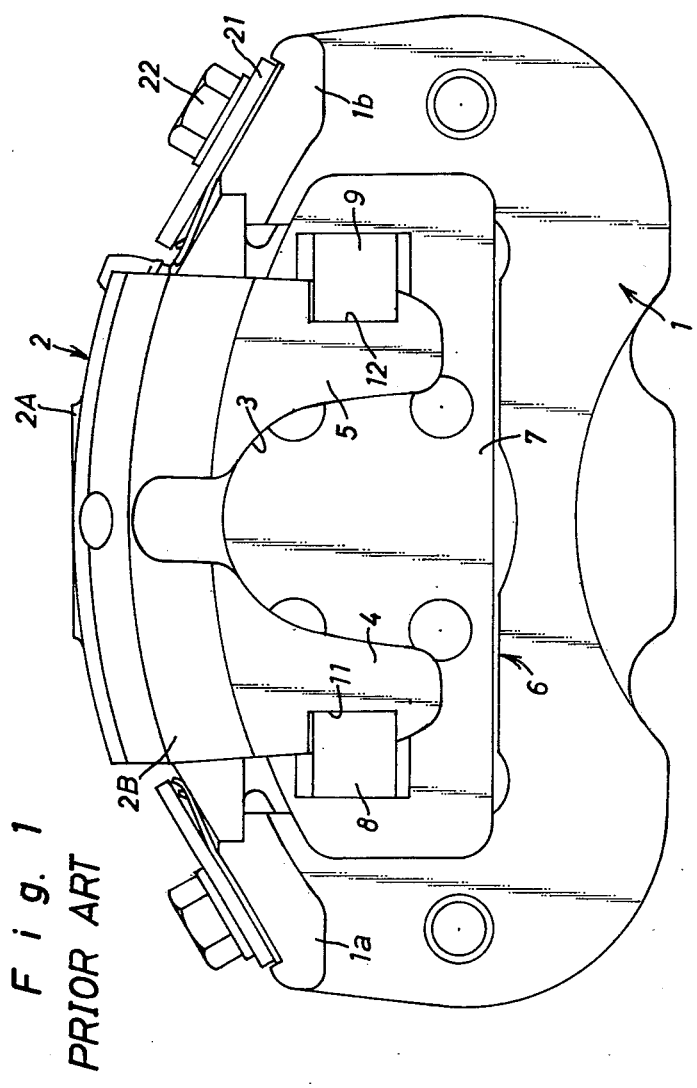
FIGS. 1 and 2 are elevational view of conventional disk brake assemblies, showing the backing plate of the outer brake shoe respectively.
Figure 2:
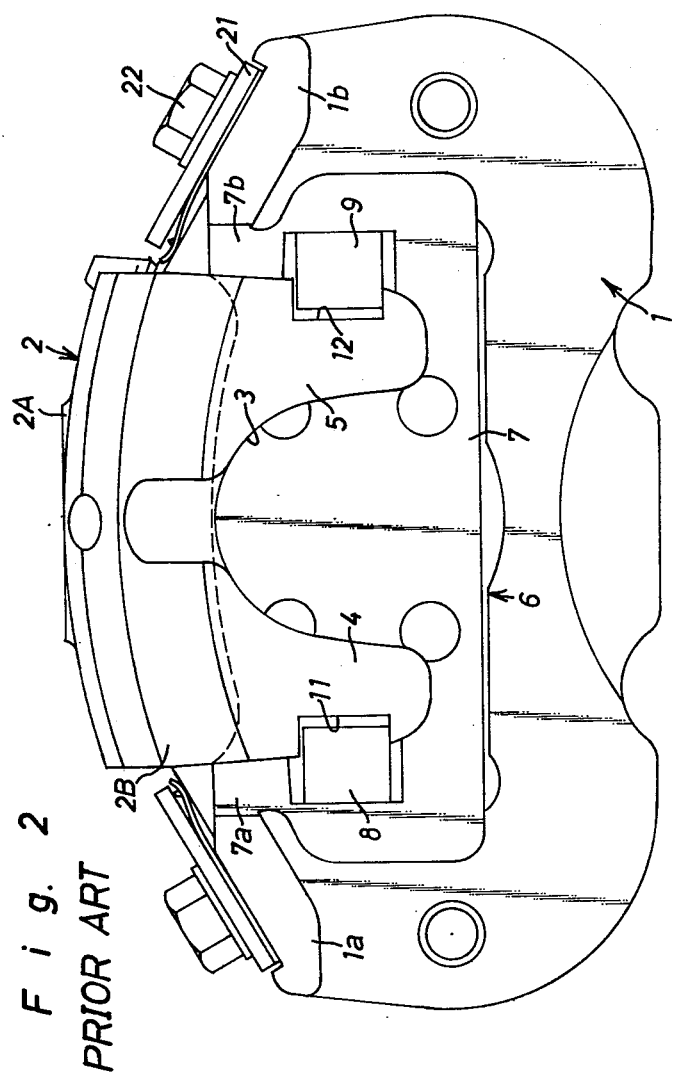
Figure 3:
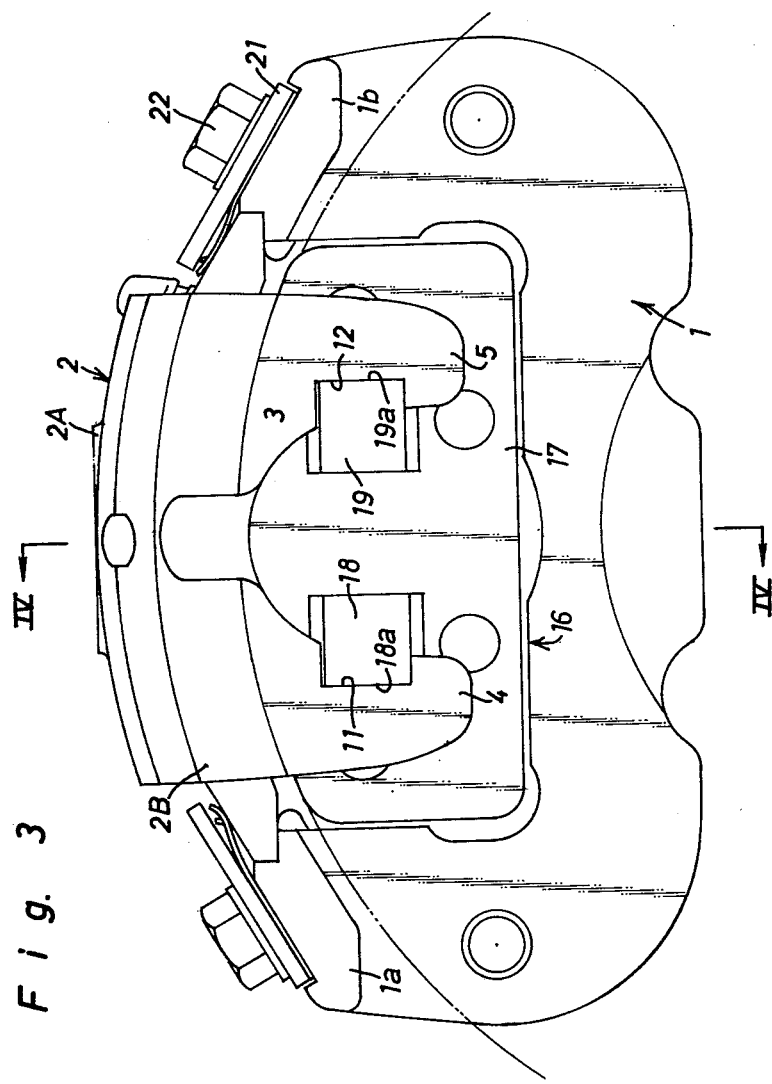
FIG. 3 is an elevational view of a disk brake assembly according to the present invention, showing an improved support structure of the backing plate of the outer brake shoe.
Figure 4:
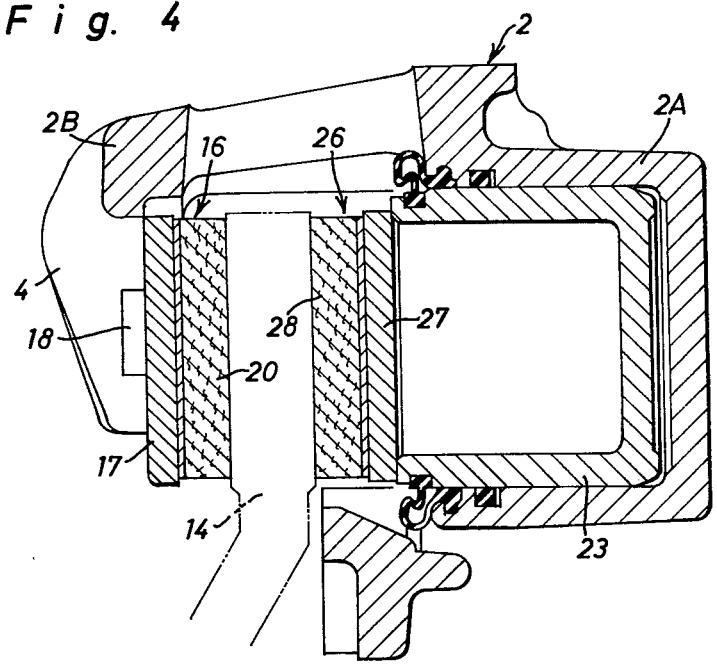
FIG. 4 is a sectional view of the structure shown in FIG. 3 taken along the line IV - IV thereof.
Figure 5:
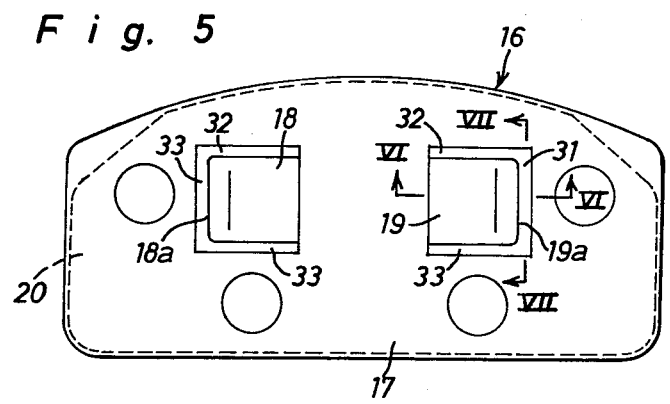
FIG. 5 is an elevational view of the outer brake shoe shown in FIG. 3.
Figure 6:
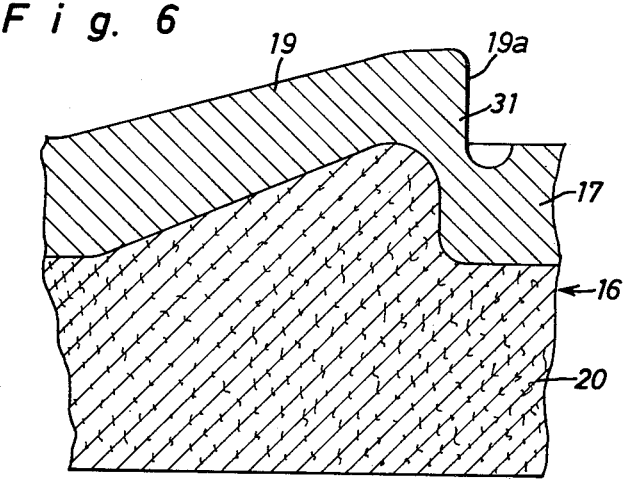
FIG. 6 illustrates a partially enlarged cross-section taken along the line VI - VI of FIG. 5.
Figure 7:
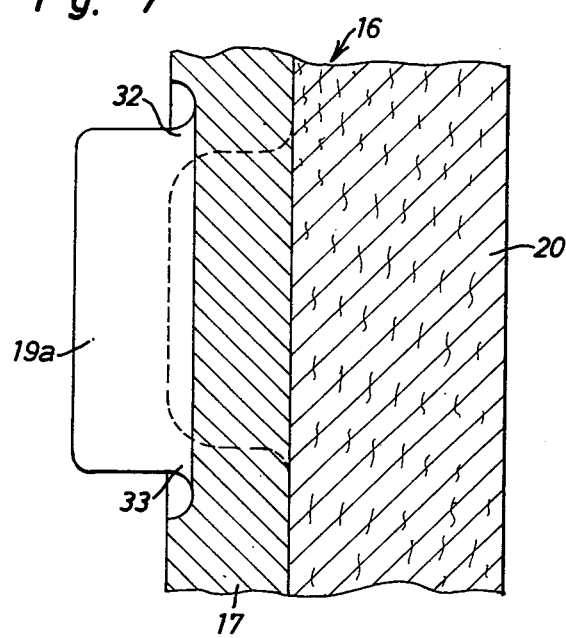
FIG. 7 illustrates a partially enlarged cross-section taken along the line VII - VII of FIG. 5.

Referring now to the accompanying drawings, in FIGS. 3 and 4, there is illustrated a sliding or floating caliper type disk brake assembly in accordance with the present invention in which a backing plate 17 of an outer brake shoe 16 is made smaller in width than the backing plate 7 of the conventional outer brake shoe 6 shown in FIG. 1. In FIGS. 3 and 4, the same or similar reference numerals are used for the same or similar construction parts or portions in FIGS. 1 and 2. Now particularly referring to FIG. 3, the rectangular shaped recesses 11 and 12 are formed on the insides of the reaction support legs 4 and 5, and the backing plate 17 is pressed at the opposite portions thereof to form a pair of abutment flanges 18 and 19, as shown in FIG. 5 and 8. The spacing between the outer edges 18a and 19a of the abutment flanges 18 and 19 is the same as the spacing between the inner shoulders of the recesses 11 and 12 to hold the outer brake shoe 16 against circumferential movements. Thus, the outer brake shoe 16 is supported in place by engagement of the abutments 18 and 19 with the recesses 11 and 12, in which the rotation torque exerted on the outer brake shoe 16 is transmitted to the caliper member 2 through the abutments 18 and 19 and then reacted against the torque plate 1. In FIG. 4, reference numeral 23 indicates the piston axially slidable in the cylinder body 2A, reference numeral 26 indicates the inner brake shoe which includes a backing plate 27 with a brake lining 28 fixed thereto, reference numeral 20 indicates the brake lining of the outer brake shoe 16, and reference numeral 14 indicates the rotary disk.

Figure 9:
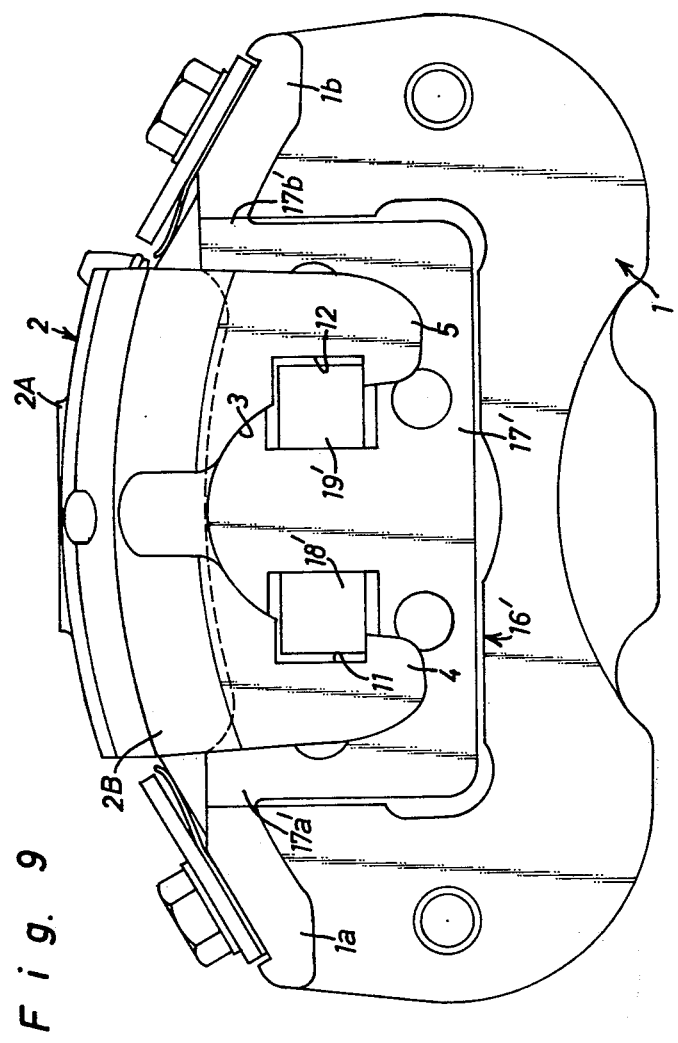
FIG. 9 is an elevational view of a modification of the disk brake assembly according to the present invention.

The present invention may be applied to a sliding caliper type disk brake assembly as shown in FIG. 9. In this disk brake assembly, the outer brake shoe 16' is supported in place by loose engagement of abutment flanges 18' and 19' with the recesses 11 and 12 at the insides of the reaction support legs 4 and 5. The backing plate 17' of the outer brake shoe 16' is engaged at the upper shoulders 17a' and 17b' with the pair of shoulders 1a and 1b of the torque plate 1 so that the rotation torque exerted on the outer brake shoe 16' is directly reacted against the torque plate 1.

With reference to FIGS. 5 through 8, it will clearly be noted that the abutment flanges 18 and 19 are formed by pressing so as to have integral thin portions 31, 32 and 33 on three of its four sides. In FIG. 10, there is illustrated a modification of the backing plate of which the abutment flanges 18" and 19" are formed by shearing to have sheared three end edges respectively. In FIG. 11, there is illustrated another modification of the backing plate of which the abutment flanges 18''' and 19''' are formed by shearing to have sheared three end edges respectively and is bent to provide a perpendicular face on the respective end edges. Furthermore, in FIGS. 12 and 13, there is illustrated still another modification of the backing plate on which a single rectangular shaped abutment 36 is formed by pressing to have opposite ends engaged within the pair of recesses 11 and 12.

Having now fully set forth both structure and operation of preferred embodiments of the concept underlying the present invention, various other embodiments as well as certain variations and modifications of the embodiments herein shown and described will obviously occur to those skilled in the art upon becoming familiar with said underlying concept. It is to be understood, therefore, that within the scope of the appended claims, the invention may be practiced otherwise than as specifically set forth herein.

What is claimed is:

1. In a disk brake assembly comprising a stationary support member having a pair of support shoulders extending in an axial direction; a rotary disk; a caliper member slidably movable on the shoulders of said stationary support member in the axial direction and straddling a portion of said rotary disk; first and second brake shoes respectively including a backing plate with a brake lining fixed thereto; said caliper member having a fluid actuator on one side thereof to press the lining of said first brake shoe against one face of said disk and a reaction portion on the opposite side thereof to press the lining of said second brake shoe against the other face of said disk due to reaction force caused by application of said fluid actuator, said reaction portion having a pair of spaced support legs to support the backing plate of said second brake shoe thereon;

the improvement comprising the backing plate of said second brake shoe being located between said shoulders of said stationary support member and smaller in length dimension than the spacing between the two shoulders of said stationary support member, and a rectangular shaped notched recess being formed on the inside surface of each said support leg and opposing each other, said recesses being opened at their inner sides respectively; and wherein the backing plate of said second brake shoe is provided thereon with a rectangular shaped abutment means engaged within said recesses to hold said second brake shoe in place against circumferential movements, said caliper member and said second brake shoe being movable radially of said stationary support member thereby allowing said abutment means to be movable in said recesses in the axial direction toward said fluid actuator for replacement of said second brake shoe.

2. A disk brake assembly as claimed in claim 1, wherein said abutment means is formed by pressing the backing plate of said second brake shoe so as to form integral thin portions of three of its four sides, respectively, engaged within said recesses.

3. A disk brake assembly as claimed in claim 1, wherein said abutment means is formed by shearing the backing plate of said second brake shoe so as to provide three sheared edges, respectively, engaged within said recesses.

4. A disk brake assembly as claimed in claim 1, wherein said abutment means is formed by opposite ends of a single rectangular shaped protrusion on the central portion of the backing plate engaged within said recesses.

* * * * *